(12) United States Patent
Lissianski et al.

(10) Patent No.: US 10,246,345 B2
(45) Date of Patent: Apr. 2, 2019

(54) WATER DESALINATION SYSTEM AND METHOD FOR FAST COOLING SALINE WATER USING TURBINES

(71) Applicant: GENERAL ELECTRIC COMPANY, Schenectady, NY (US)

(72) Inventors: Vitali Victor Lissianski, Schenectady, NY (US); Douglas Carl Hofer, Clifton Park, NY (US); John Aibangbee Osaheni, Clifton Park, NY (US); Rajkeshar Singh, Clifton Park, NY (US); Anna Lis Laursen, Niskayuna, NY (US); Francisco J. Moraga, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 599 days.

(21) Appl. No.: 14/983,658

(22) Filed: Dec. 30, 2015

(65) Prior Publication Data
US 2017/0190597 A1 Jul. 6, 2017

(51) Int. Cl.
| | |
|---|---|
| *B01D 9/00* | (2006.01) |
| *C02F 1/22* | (2006.01) |
| *C02F 101/10* | (2006.01) |
| *C02F 103/08* | (2006.01) |

(52) U.S. Cl.
CPC .............. *C02F 1/22* (2013.01); *B01D 9/0009* (2013.01); *B01D 9/0059* (2013.01); *B01D 2009/0086* (2013.01); *C02F 2101/10* (2013.01); *C02F 2103/08* (2013.01); *C02F 2305/00* (2013.01)

(58) Field of Classification Search
CPC .... C02F 1/22; C02F 2101/10; C02F 2103/08; C02F 2305/00; B01D 9/0009; B01D 9/0059; B01D 2009/0086
See application file for complete search history.

(56) References Cited

U.S. PATENT DOCUMENTS

| | | | |
|---|---|---|---|
| 3,714,791 A | 2/1973 | Peck | |
| 3,813,892 A * | 6/1974 | Johnson | B01D 9/0004 62/535 |
| 5,167,838 A | 12/1992 | Wilensky | |
| 5,400,619 A | 3/1995 | Husseiny et al. | |
| 5,537,832 A | 7/1996 | Keus | |
| 5,555,747 A | 9/1996 | Conlon | |
| 5,558,778 A | 9/1996 | Janssen et al. | |
| 5,729,987 A | 3/1998 | Miller | |
| 6,349,563 B1 | 2/2002 | Kinoshita | |
| 6,436,296 B1 | 8/2002 | White | |
| 7,073,337 B2 | 7/2006 | Mangin | |

(Continued)

FOREIGN PATENT DOCUMENTS

| | | |
|---|---|---|
| CN | 1198407 A | 11/1998 |
| CN | 103408077 A | 11/2013 |

(Continued)

*Primary Examiner* — James C Goloboy
(74) *Attorney, Agent, or Firm* — GE Global Patent Operation; John Darling

(57) ABSTRACT

A desalinating system and method is disclosed. The desalination system comprises using a turbo freeze or fast-cooling process to freeze saline water droplets and separate salt crystals from pure water crystals, wherein said system provides for simultaneous injection of saline water droplets and a chilled refrigerant into a freezing chamber at a slip velocity sufficient to reduce the size of the saline water droplets to an optimal diameter.

19 Claims, 9 Drawing Sheets

(56) References Cited

U.S. PATENT DOCUMENTS

| | | |
|---|---|---|
| 7,458,231 B1 | 12/2008 | Vanden Bussche et al. |
| 7,467,526 B2 | 12/2008 | Hsieh |
| 7,974,076 B2 | 7/2011 | Xiong et al. |
| 8,282,791 B2 | 10/2012 | Nirmalakhandan et al. |
| 8,333,887 B2 | 12/2012 | Silva |
| 8,863,547 B2 | 10/2014 | Enis et al. |
| 2007/0295673 A1* | 12/2007 | Enis .......................... C02F 1/10 210/766 |
| 2009/0025421 A1 | 1/2009 | Enis et al. |
| 2010/0115989 A1 | 5/2010 | Chrysostomou et al. |
| 2011/0024354 A1 | 2/2011 | Xia et al. |
| 2011/0042232 A1 | 2/2011 | Cai et al. |
| 2011/0147195 A1 | 6/2011 | Shapiro et al. |
| 2011/0162952 A1 | 7/2011 | Conchieri et al. |
| 2011/0303607 A1 | 12/2011 | Vora et al. |
| 2012/0048803 A1 | 3/2012 | Shapiro |

FOREIGN PATENT DOCUMENTS

| | | |
|---|---|---|
| CN | 103175358 B | 3/2015 |
| EP | 0730893 B1 | 12/1999 |
| EP | 2203390 B1 | 4/2011 |
| EP | 2136895 B1 | 5/2011 |
| WO | 9935454 | 7/1999 |
| WO | 0029333 | 5/2000 |
| WO | 2006113946 A1 | 10/2006 |
| WO | 2008113387 A1 | 9/2008 |
| WO | 2008113395 A1 | 9/2008 |
| WO | 2009129550 A2 | 10/2009 |
| WO | 2010053483 A1 | 5/2010 |
| WO | 2012104787 A1 | 8/2012 |
| WO | 2013054218 A1 | 4/2013 |

* cited by examiner

WATER DESALINATION SYSTEM AND METHOD FOR FAST COOLING SALINE WATER USING TURBINES

STATEMENT ON FEDERALLY SPONSORED RESEARCH OR DEVELOPMENT

This invention was made with government support under grant number DE-FE0024022 awarded by the U.S. Department of Energy. The government has certain rights in the invention.

FIELD OF THE INVENTION

Embodiments of the invention relate to the field of desalination of liquids. Embodiments of the invention relate to a desalination system and method.

BACKGROUND

Fresh water shortage affects roughly one-third of the world's population and is becoming more critical in recent years due to drought, population increase, development of population centers in arid areas, and pollution. About 97.5% of the water on earth is saltwater and the remaining about 2.5% is fresh water. Therefore, a practical, economically viable desalination process is crucial to overcoming this crisis. For these reasons, and others, desalination is an important issue.

Desalination can be accomplished by a number of methods known in the art. Conventionally, the most commonly used desalination process involves variations of one or more thermal processes, for example evaporation or distillation. These thermal methods involve a high energy requirement and, therefore, the cost of desalination historically has been high, limiting desalination as a viable large scale option in many parts of the world. Other known desalination methods include membrane processes, e.g. filtration and electrical separation methods such as reverse osmosis (RO). Although these processes gradually have improved in energy consumption, large scale operations still incur high operating costs and experience obstacles such as membrane fouling, capacity limitations, and expensive construction materials.

Freeze crystallization is a thermal desalination process wherein saline water is chilled to a temperature sufficient for the saline water to freeze. It is based on the fundamental principle that the structure of an individual ice crystal does not accommodate salts. As a result, ice crystals, formed after water in brine freezes and is separated from the resulting salt crystals, consist of pure water. These pure ice crystals can then be separated from the salt crystals and melted to form pure water.

In operation, freeze crystallization can be achieved by direct cooling or indirect cooling. Once the saline water is frozen and ice crystals of non-saline, purified water have formed, the ice crystals are separated via known means in the art from the resulting residual brine or solid salt crystals. The separated ice crystals are then melted to produce non-saline, drinking or potable water (for example, water with less than 100 ppm salinity).

Despite its potential, the freeze crystallization process has not been successfully implemented on a large, commercial scale. Historically, there have been three principal challenges (1) the difficulty in using refrigeration systems to efficiently freeze large quantities of saline water without forming large chunks of ice; (2) high operating costs; and (3) equipment/plant complexity. Systems that utilize indirect cooling (e.g external refrigeration) require large vessels to hold the saline water, which results in inefficient heat transfer between the refrigerant and the saline water. Direct refrigerant injection into the saline water exhibits a higher heat transfer surface area, but requires the additional step of the recovering refrigerant from the saline water. In both methods, the complexity of handling and separating the brine/ice slurry remains an obstacle.

Because of the drawbacks of the existing desalination and freeze crystallization methods discussed above, there is a need for a highly efficient and cost effective desalination method that allows fresh drinking (i.e. potable) water to be produced from saline water utilizing a turbo freeze process. The method disclosed herein solves the obstacles of conventional freeze desalination technologies by providing an energy efficient method to form ice crystals without limitations of existing systems. Furthermore, close to 100% of the water can be frozen since heat transfer in the process does not require the presence of the liquid phase. The resulting dry mixture of ice and salt crystals can be mechanically separated, thus reducing the equipment complexity often required for conventional freeze crystallization processes.

It therefore is an object of the present disclosure to provide a novel, cost-effective and efficient process for desalinating saline water using a turbo freeze, vapor-compression-expansion method, wherein direct contact between a cold expanding stream of compressed fluid and saline water droplets allows for the simultaneous production of ice crystals (containing pure water) and salt crystals, which can then be readily separated. As described herein, the energy required for the saline water cooling and water freezing is provided by the expanding and cooling of compressed fluid and vaporization of the fluid. The fluid is a refrigerant that will condense under conditions similar to those used in conventional air conditioner units. More specifically, when the fluid refrigerant is compressed and at least partially condensed, it will create a chilled temperature (i.e. "fast-cooling", "hyper-cooling" or "turbo-cooling") upon expansion. The partially condensed refrigerant is directly mixed with the saline water droplets at a sufficient slip velocity such that the chilled refrigerant reduces the temperature of the saline water to produce frozen ice particles and salt crystals within a reduced residence time as compared to other methods.

The process disclosed herein is fast, reduces energy requirements, has less complex and smaller equipment, a high fresh water production (potential of 100%), and is more cost efficient for treatment of high salinity water than other methods.

SUMMARY OF THE INVENTION

In accordance with one embodiment, a desalination system is provided. The system comprises a feed source of saline water; a feed source of at least one refrigerant; a compressor, comprising an input fluidly coupled to the source of said at least one refrigerant and an output, and configured to generate a compressed vaporized refrigerant; a condenser comprising an input fluidly coupled to the compressor and an output, said condenser operatively configured to generate a chilled, partially liquefied refrigerant stream; at least one expansion device comprising at least one input fluidly coupled to the condenser and at least one output configured to release the chilled refrigerant stream at a refrigerant stream injection velocity; a freezing chamber comprising at least one input to introduce the chilled refrigerant stream into the chamber, and a first, second and third output, and at least one injector configured to introduce the saline water into the freezing chamber in the form of saline water droplets, wherein the at least one ejector introduces the saline water droplets into the freezing chamber at a slip injection velocity relative to the refrigerant stream injection velocity of about 10% to about 180%; and wherein direct contact in the chamber between the saline water droplets and the refrigerant stream forms ice particles comprising pure water. In certain embodiments, the expansion device is a two-stage turbo expander and is adapted to also function as the freezing chamber. In others, the freezing chamber is a separate crystallization tank.

In another aspect of the present disclosure, the desalination system comprises a sprayer operatively configured to introduce saline water droplets with an initial diameter (di) in the range of about 200 microns ($\mu$) to about 1000 microns ($\mu$) into the freezing chamber, and introduces the saline water droplets into the freezing chamber at a slip injection velocity relative to the refrigerant stream velocity that is sufficient to achieve saline water droplets with a reduced diameter in the range of about 10 microns ($\mu$) to about 50 microns ($\mu$).

In another aspect of the present disclosure, the desalination system comprises a compressor, a turbo expander, and a freezing chamber, said compressor, said turbo expander and the freezing chamber connected in a closed system to circulate a refrigerant stream; and an injector configured to introduce simultaneously into the freezing chamber the refrigerant stream and a saline water stream in the form of saline water droplets, wherein the refrigerant stream has a predetermined velocity and the saline water droplets have an initial diameter (di) of less than about 1 millimeter (mm) and are introduced at a slip velocity ratio of about 90% relative to the refrigerant stream velocity; and wherein direct contact between the saline water droplets and the refrigerant stream in the freezing chamber forms ice particles comprising purified water within about 10 microseconds (ms) to about 300 microseconds (ms). In certain embodiments, system 10 also includes a condenser. The refrigerant is a hydrocarbon, ammonia, air, chlorine-bearing or fluorine-bearing carbon compounds, hydrocarbons, methyl chloride, and/or mixtures thereof.

In another aspect of the present disclosure, a method of desalination is provided. The method comprises the steps of: (a) providing at least one refrigerant and a feed source of saline water; (b) compressing the at least one refrigerant to generate a partially liquefied, chilled refrigerant stream; (d) expanding the refrigerant stream through an expansion device; (e) injecting the saline water into a freezing chamber in the form of water droplets, wherein said saline water droplets have an initial diameter (di) of less than about 1 millimeter (mm); contacting the saline water droplets with the expanded refrigerant stream in the freezing chamber at a slip injection velocity relative to the refrigerant stream injection velocity of about 10% to about 180% and for a residence time of about 100 to 300 milliseconds (ms), thereby freezing the water droplets to form ice particles comprising no or essentially no salt; (g) removing and storing the salt crystals and the ice particles in two different collectors; (h) delivering the ice particles to an ice melter; and (i) withdrawing pure water from the ice melter. In certain embodiments, the method also includes the stop of condensing the refrigerant prior to expansion.

The present disclosure and its advantages over the prior art will become apparent upon reading the following detailed description and the appended claims. These and other objects, features and advantages of this disclosure will become apparent from the following detailed description of the various aspects of the disclosure taken in conjunction with the accompanying drawings.

BRIEF DESCRIPTION OF THE DRAWINGS

These and other aspects of the present disclosure will be understood from the description and claims herein, taken together with the drawings showing details of construction and illustrative embodiments, wherein:

DETAILED DESCRIPTION OF THE INVENTION

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about."

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

As used herein, the term "saline water" refers to the water that contains a significant amount of at least one kind of dissolved salt at a given temperature. Can also be referred to as, or used interchangeably with, the terms salt water, sea water, brackish water, or brine.

As used herein, the term "purified water" or "pure water" or "fresh water" means water containing no or low concentrations of dissolved salts, and more specifically water having a salinity of less than 0.05% at a given temperature.

For purposes of this application "drinking water" or "potable water" is defined as fresh water that is safe enough for drinking or food preparation.

As used herein, the term "vessel" or "tank" includes storage mediums known in the art, including but not limited to pipes, containers, chambers, reservoirs, vats, and other receptacles.

As used herein, the term micron ($\mu$) and micrometer ($\mu$m) are interchangeable and defined as an SI derived unit of length equaling $1\times10^{-6}$ of a meter.

Figure 1:
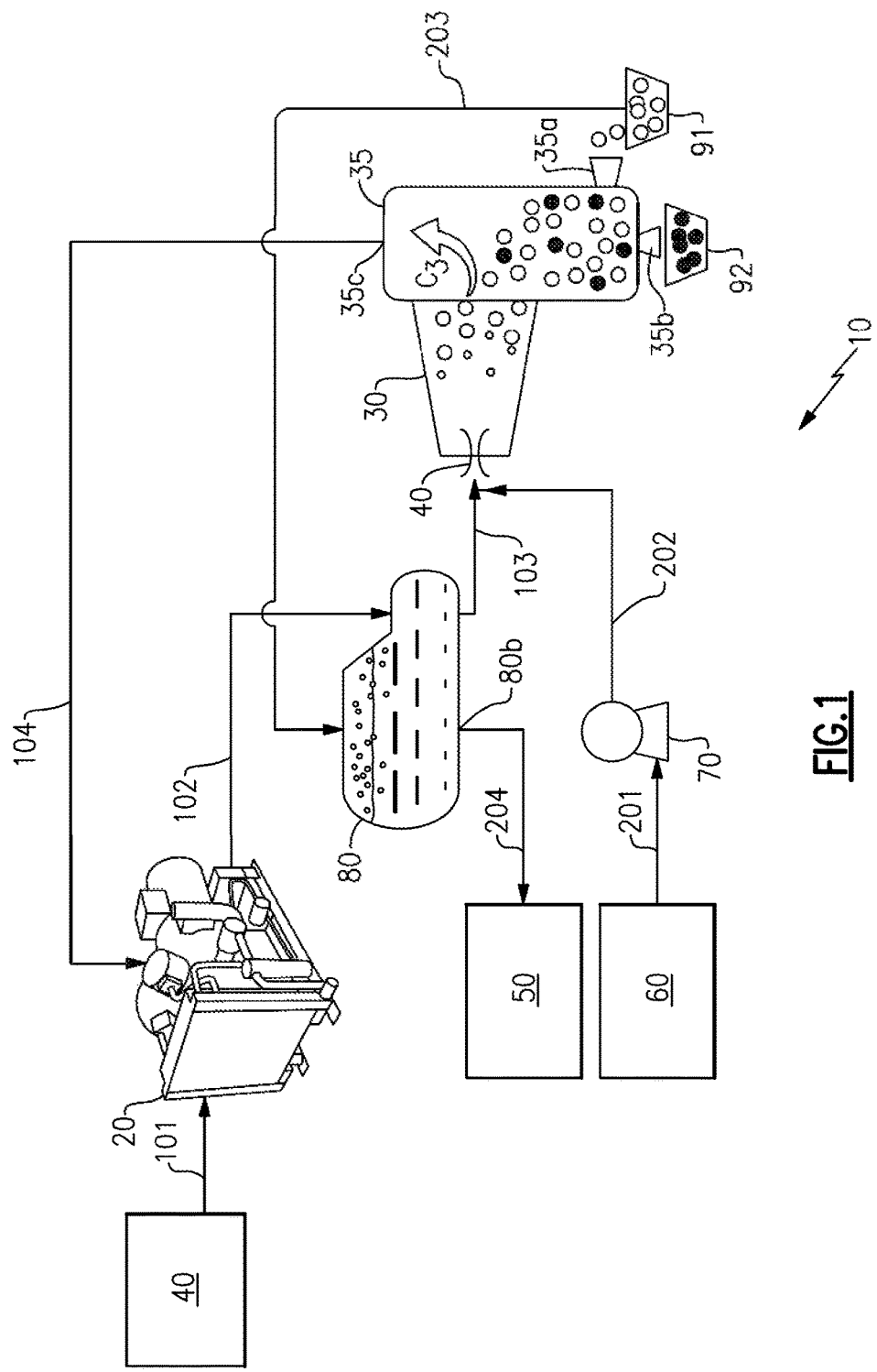
FIG. 1 is a simplified schematic of an embodiment of the desalinating system in accordance with aspects of the present disclosure.

The current disclosure provides for a method of desalination. More specifically, desalination using a turbo freeze process. FIG. 1 is a simplified diagrammatic/schematic view of an exemplary turbo freeze desalination system 10 having a feed source of saline water 60 and a feed source of at least one refrigerant 40. In accordance with the present disclosure, saline water 60 includes slightly saline water (about 1,000 to 3,000 ppm (0.1-0.3%)), moderately saline water (about 3,000 to 10,000 ppm (0.3-1%)), highly saline water (about 10,000 to 35,000 ppm or 1-3.5%), and brine. Seawater, a highly saline water, typically has a salinity of about 35,000 ppm. Brine refers to any water with an extremely high salinity of greater than 3.5% (e.g. including up to and including 15%, 20%, etc), and brackish water refers to water with a salinity of about 0.05% to about 3%. For purposes of this disclosure, the term saline water includes each of the above terms.

Referring to FIG. 1, desalination system 10 employs at least one compressor 20, condenser 80, expanding device 30 and freezing chamber 35. System 10 also includes at least one pump 70 for compressing saline water 60 and for introducing saline water 60 into the at least one ejector (or nozzle) 40. One of ordinary skill in the art will recognize that the fluids circulating through system 10 can flow through the system via known-in-the-art mass-transport forces, such as pumping, gravity, pressure, and suction.

In embodiments of the present disclosure, refrigerant 40 is capable of at least partially condensing into a liquid at temperatures slightly above 0° C. In one embodiment, the refrigerant is propane or ammonia. In still other embodiments, the refrigerant is a chlorine-bearing or fluorine-bearing carbon compounds, hydrocarbons, methyl chloride, and/or mixtures thereof. By way of example only, the hydrocarbon could be propane, iso-pentane, butane, iso-butane, pentane and mixtures thereof. Additional refrigerants would include any chlorofluorocarbon (CFC), hydrochlorofluorocarbon (HCFC), or hydrofluorocarbon (HFC) refrigerant. One of ordinary skill in the art will recognize, however, that any refrigerant that is capable of changing phase to at least partially condense at practical temperatures and pressures (i.e. mild conditions) for a large-scale system is suitable.

More specifically, a refrigerant that absorbs heat by evaporating below the freezing point of water (32° F./0° C.) while at a relatively low pressure, is attractive. On the other hand, the same refrigerant must be able to condense at temperatures not greatly higher than normal ambient temperatures and at pressures attainable by modern compressors. Furthermore, the use of air as a refrigerant is contemplated and is within the scope of this disclosure. One of ordinary skill in the art would recognize, however, that if air is used as the refrigerant the configuration of system 10 would be modified. For example, system 10 would not include a condenser (not shown).

Referring to FIG. 1, system 10 includes a compressor 20 comprising an input 20a (not shown) and output 20b (not shown), wherein input 20a is fluidly coupled (101) to a feed source of at least one refrigerant 40. Compressor 20 is configured to generate a stream of compressed vaporized refrigerant 102, wherein compressed vaporized refrigerant 102 is compressed to a higher pressure, resulting in a higher temperature as well (e.g. superheated vapor). In the diagram shown in FIG. 1, only one compressor is shown. However, system 10 can include multiple stages of compression that requires the use of multiple compressors in various arrangements depending on the conditions and requirements of the systems (for example, see FIG. 2). The present disclosure contemplates that compressor 20 will comprise any conventional means of compressing fluids. For example, in embodiments of the invention, compressor 20 is a conventional gas compressor. In accordance with the disclosure, compressor 20 can be a reciprocating, rotary screw, centrifugal, or scroll compressor. Furthermore, compressor 20 can either be open, hermetic, or semi-hermetic.

Referring again to FIG. 1, compressed vaporized refrigerant 102 is then passed through a condenser. In the embodiment shown here, condenser 80 is operatively configured to cool and condense refrigerant stream 102 into a chilled, partially liquefied refrigerant stream 103 via indirect heat exchange. In one aspect of the present disclosure, condenser 80 is an ice melter. For example, and referring to FIG. 1, condenser 80 is an ice melter configured to melt ice particles delivered from a freezing chamber (e.g. at the back-end of the process). In this way, the ice melter both generates a purified water stream 204 and also condenses the refrigerant stream 102 to generate a partially liquefied, chilled refrigerant stream 103 via indirect heat exchange. In this embodiment, condenser 80 comprises an input 80a and output 80b, said input 80a fluidly coupled to ice separator 91 and said output 80b fluidly coupled to storage tank 50. While it is contemplated that system 10 can include other conventional device or unit capable of condensing fluid 40 from its gaseous to its liquid state by cooling it, the embodiment illustrated in FIG. 1 allows system 10 to recover energy invested in the freezing of the saline water by using it to condense the refrigerant, thereby increasing process efficiency and reducing power requirements for the system.

The condensed refrigerant stream 103, which is at least partially-liquefied and in the thermodynamic state known as a saturated liquid, is next routed through expansion device 30 where it undergoes an abrupt reduction in pressure and lowers the temperature of the liquid and vapor refrigerant mixture. Expansion device 30 produces a high velocity, chilled stream of refrigerant, which in turn lowers the temperature in the freezing chamber 35 to the desired temperature to freeze the injected saline water droplets.

Referring to FIG. 1, expansion device 30 is fluidly coupled to the condenser 80 and comprises at least one input 30a and, optionally, at least one output 30b to release the compressed fluid and create an extremely cold refrigerant stream that will provide sufficient hyper-cooling for the turbo freeze desalination process described herein. In accordance with the present disclosure, expansion device 30 is a turboexpander (or turbo-expander; expansion turbine). In embodiments of the present disclosure, the turboexpander is a low-pressure turbine capable of handling multiphase flows. The turboexpander can be a radial or axial flow turbine, however one of ordinary skill in the art will recognize that any conventional expander capable of converting compressed fluids into an expanded, chilled fluid and also capable of handling multi-phase fluids (e.g. 2 or preferably, 3, phases) can be used. In still other embodiments, one or more turbo expanders are used (i.e. a multi-stage expander).

Figure 5:
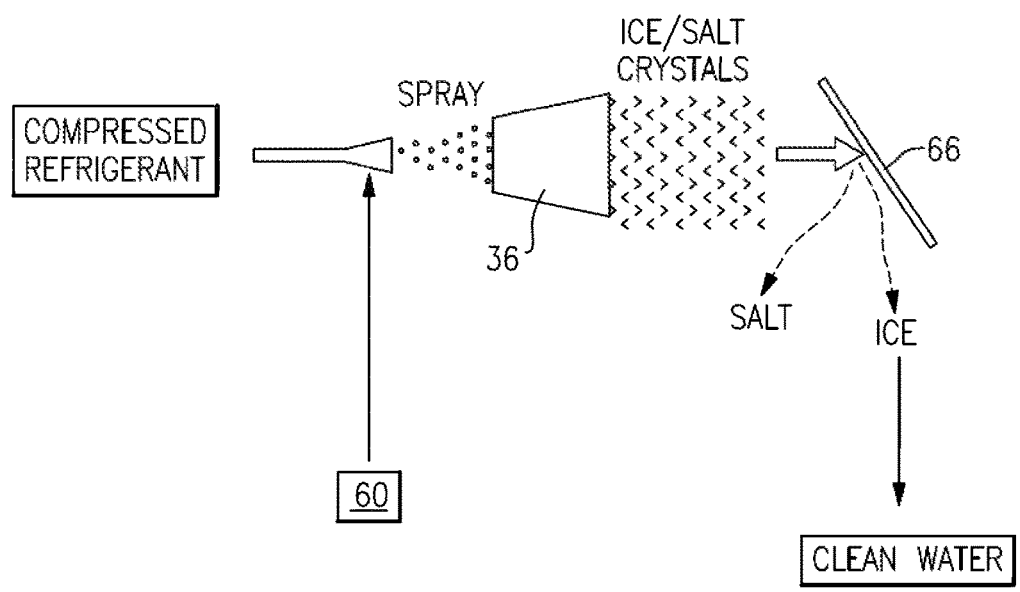
FIG. 5 is a simplified schematic view depicting a multiphase turbo expander that functions as both an expanding device and a freezing chamber in accordance with aspects of the present disclosure.

In the embodiment shown in FIG. 1, turbo expander 30 is fluidly connected to a separate freezing chamber 35 (i.e. crystallization tank). In yet another embodiment, turbo expander 30 is a multi-stage (see FIG. 2) expander comprised of more than one expander. In a preferred embodiment, expansion device 30 is also a multi-phase turbo expander adapted to function with three phases: vapor, liquid (brine) and solid (ice and salt crystals). In this embodiment, and as shown in FIG. 5, the multi-phase turbo expander is adapted to function as both the freezing chamber 35 and the expansion device 30. In other words, turbo expander 30 and freezing chamber 25 are operatively combined into a single expansion and freeze crystallization device.

In accordance with this disclosure, regardless of the specific device used, expansion device 30 is capable of receiving an input in the range of about 44 pounds per square in absolute or psia (SI units=303369 Pa) to about 220 psia (SI units=1516847 Pa) and of producing an output in the range of about 14.7 psia (SI units=101353 Pa) to about 44 psia (SI units=303369 Pa). In embodiments of the present disclosure, the requisite input and output capacities for the expansion device will vary and depend on the characteristics of the fluids and other environmental factors. For example, in some embodiments the input capacity will be 44, 45, 50, 55, 65, 25, 27, 30, 35, 50, 100, 120, 150, 200 or 220 psia, including any and all values, ranges and subranges therein (e.g., 44 to 220 psia, 44 to 60 psia, 44 to 100 psia, 50 to 200 psia, 50 to 150 psia, 100 to 220 psia, 70 to 100 psia, 200 to 220 psia, etc.). In some embodiments the output capacity will be 14.7, 15, 16, 20, 23, 25, 25, 27, 30, 32, 35, 40, 43 or 44 psia, including any and all values, ranges and subranges therein (e.g., 14.7 to 44 psia, 16 to 44 psia, 25 to 44 psia, 30 to 40 psia, 14.7 to 22 psia, 14.7 to 30 psia, 20 to 30 psia, 40 to 44 psia, etc.). For purposes of the above values, one of ordinary skill in the art will recognize that the US customary unit for pressure, pounds per square inch absolute (psia) is equivalent to and can be converted to SI units using a conversion of 1 psia is equal to 6894.75728 pascal (Pa).

Referring back to FIG. 1, whether combined with expansion device 30 or configured as a separate crystallization chamber, freezing chamber 35 comprises a first, second and third outlet 35a, 35b, 35c. Freezing chamber 35 is operatively configured to provide direct contact between the compressed, chilled refrigerant stream and the saline water stream. To introduce the compressed and chilled refrigerant stream 103 into freezing chamber 35, at least one injector 40 is configured to introduce the compressed saline water 202 into said chamber 35 in the form of saline water droplets. When the saline water droplets contact the incoming refrigerant stream, the refrigerant vaporizes and the saline water droplets freeze to simultaneously form ice particles and salt crystals. In certain embodiments, the temperature of the refrigerant stream in the freezing chamber is about 0° C. to about −50° C. For example, in some embodiments refrigerant stream has a flow velocity of 0, 15.5, 15.6, 16, 20, 25, 30, 32, 38, 40, 45, 50, 60, 60.5, −50° C., including any and all values, ranges and subranges therein (e.g., 0 to −50° C., 0 to −48° C., 0 to −45° C., 0 to −20° C., 0 to −10° C., 0 to −5° C., 0 to −2° C., −2 to −50° C., −5 to −40° C., −2 to −30° C., −21 to −23° C., −21 to −25° C., etc.). While not meant to be limiting, in preferred embodiments, the temperature is approximately 0° C., or a little below 0° C. (e.g. −1° C., −2° C., −5° C.).

In embodiments of the present disclosure, refrigerant stream has a flow velocity in the range of about 15 m/sec to about 61 m/sec as it travels through freezing chamber 35. For example, in some embodiments refrigerant stream has a flow velocity of 15, 15.5, 15.6, 16, 20, 25, 30, 32, 38, 40, 45, 50, 60, 60.5, 61 m/sec, including any and all values, ranges and subranges therein (e.g., 15 to 61 m/sec, 15 to 60 m/sec, 15 to 45 m/sec, 15 to 20 m/sec, 16 to 60 m/sec, 20 to 61 m/sec, 25 to 60 m/sec, 50 to 60 m/sec, etc.).

In accordance with the present disclosure, freezing chamber 35 has an inner surface that defines a volume and the size and configuration of chamber 35 can vary, depending on the system needs and capacities required. Further, freezing chamber 35 includes at least one inlet (not shown in detail) from which the refrigerant stream enters freezing chamber 35, and at least one outlet 35a/35b from which the salt crystals and ice crystals exit freezing chamber 35. In operation, the refrigerant vapors exit freezing chamber 35 via out 35c and are recycled back to compressor 20 to form a closed loop refrigeration system.

In accordance with embodiments of the present disclosure, injector 40 preferably is equipped with a nozzle configured to introduce pressurized saline water 60 into chamber 35 in the form of a spray comprising saline water droplets. In embodiments of the present disclosure, injector 40 is a sprayer comprising a nozzle operatively configured to introduce saline water droplets with an initial diameter ($d_i$) less than 1 mm in diameter, more preferably an initial diameter ($d_i$) of about 200 microns (μ) to about 1000 microns (μ), into freezing chamber 35. For example, in some embodiments, saline water droplets with an initial diameter ($d_i$) of 200, 201, 205, 210, 250, 300, 350, 400, 500, 550, 600, 700, 800, 900, 995, 999, 1000 microns, including any and all values, ranges and subranges therein (e.g., 200 to 1000 microns, 200 to 999 microns, 200 to 900 microns, 200 to 700 microns, 200 to 500 microns, 200 to 250 microns, 201 to 1000 microns, 205 to 999 microns, 500 to 1000 microns, 600 to 900 microns, etc.).

In embodiments of the present disclosure, injector 40 also is operatively configured to introduce saline water droplets at a high slip velocity relative to the velocity of refrigerant stream. More specifically, in an exemplary embodiment, the injector introduces the saline water droplets into the freezing chamber at a velocity in the range of about 0.3 m/sec to about 31 m/sec, including all ranges in between, and at a slip injection velocity relative to the refrigerant stream velocity that is sufficient to reduce the diameter of the saline water droplets in the chamber to a reduced diameter ($d_r$) in the range of about 10 microns (μ) to about 100 microns (μ), and more preferably in the range of about 10 microns (μ) to about 50 microns (μ).

For example, in some embodiments, saline water droplets are introduced into the freezing chamber at a velocity of 0.3, 0.4, 0.5, 0.8, 1.0, 2.0, 9, 10, 15, 20, 29, 30, 31 m/sec, including any and all values, ranges and subranges therein (e.g., 0.3 to 31 m/sec, 0.3 to 30 m/sec, 0.3 to 20 m/sec, 0.3 to 10 m/sec, 0.5 to 31 m/sec, 0.9 to 31 m/sec, 1.5 to 31 m/sec, 10 to 31 m/sec, 20 to 31 m/sec, 25 to 31 m/sec, 0.3 to 1.0 m/sec, etc.). Furthermore, it is contemplated that in some embodiments, the slip injection velocity is sufficient to produce saline water droplets with a reduced diameter ($d_r$) of 10, 11, 15, 20, 33, 40, 60, 75, 80, 90, 99, 100 microns, including any and all values, ranges and subranges therein (e.g., 10 to 100 microns, 10 to 90 microns, 10 to 50 microns, 10 to 30 microns, 50 to 100 microns, 70 to 100 microns, 90 to 100 microns, etc.).

For purposes of this disclosure, slip velocity in gas-liquid (two-phase) flow is defined as the difference between the velocity of the vaporized refrigerant stream and the velocity of the salt water stream (or, said another way, slip velocity is defined as the velocity of the vaporized refrigerant stream minus the velocity of the salt water stream). Likewise, slip ratio (or velocity ratio) in gas-liquid (two-phase) flow is defined as the ratio of the velocity of the vaporized refrigerant (gas phase) to the velocity of the salt water droplet stream (liquid phase). By way of example only, in accordance with one aspect of the present disclosure, injector 40 is configured to introduce saline water stream 202 into freezing chamber 35 in the form of saline water droplets at a minimum spray velocity of about 10 m/s. By way of example only, high saline droplet velocity slip relative to the refrigerant stream is achieved by using cross-flow injection of droplets in the refrigerant stream.

While any size and variations of injector configurations are contemplated, the configuration of injector 40 is sufficient to produce a minimum spray velocity of about 0.3 m/s and saline water droplet size in the range of less than 1 millimeter (mm). Injector 40 will also be selected in accordance with the pressure, spray angle and distribution pattern required for the particular system and conditions, and generally speaking, an injector configuration that operates at higher pressures will produce saline water droplets with a smaller initial diameter. Although not meant to be limiting, in the examples disclosed herein, the injector operates at saline water pressures in the range of about 2 bar to about 10 bars.

As discussed above, in preferred embodiments, the saline water droplets introduced into expander 30 have an initial diameter ($d_i$) of less than 1 millimeter (mm) and are injected at a high slip velocity relative to refrigerant stream 103. In certain embodiments, the slip velocity range relative to refrigerant stream 103 is in the range of about 10 to 180%. For example, it is contemplated that in some embodiments, the slip injection velocity relative to refrigerant stream 103 is 10%, 20%, 30%, 60%, 90%, 110%, 120%, 150%, 180%, including any and all values, ranges and subranges therein (e.g., 10% to 180%, 50% to 180%, 60% to 179%, 100% to 150%, 150% to 180%, 60% to 120%, 48% to 120%, etc.).

When the saline water droplets are injected at this high slip velocity relative to the refrigerant stream, it causes the droplets to breakdown and reduces the time required for the droplets to freeze (i.e. "freezing time" or $T_f$). At this velocity and droplet size, the system enables the droplets to freeze within a short residence time (or "RT") in either a separate turbo expander and crystallization tank, or alternatively a combined expander/freezing chamber. For purposes of this disclosure, residence time is defined as the average amount of time a particle (or, in this case, a water droplet) will spend in the freezing chamber under set conditions. As is typical in the art, residence time is calculated from the moment a particle enters the freezing chamber and ends the moment it would leave the chamber. However, one of ordinary skill in the art will recognize that it will change and can be defined as needed according to the application, the inflow and outflow rates, and the size of the desalination system (e.g. size of the turbo expander).

For example, assuming a typical turbo expander under steady-state conditions, a characteristic residence time of a particle in a turbo expander is in the range of about 100 milliseconds (ms) to about 300 milliseconds (ms). Furthermore, it is contemplated that in some embodiments, the RT will be 100, 105, 110, 150, 180, 200, 250, 280, 299, or 300 ms, including any and all values, ranges and subranges therein (e.g., 100 to 300 ms, 110 to 300 ms, 120 to 290 ms, 121 to 150 ms, 200 to 300 ms, 250 to 300 ms, 100 to 200 ms, 100 to 150 ms, 100 to 130 ms, 100 to 110 ms, 200 to 250 ms, etc.).

To achieve a freezing time ($T_f$) of less than 100 ms, the saline water droplets require a reduced diameter ($d_i$) of less than 100 microns ($\mu$). One of ordinary skill in the art will recognize that a shortened time for freezing ($T_f$) means that system 10 can incorporate smaller equipment because less distance is needed for the droplet to freeze. In turn, smaller equipment sizes for system 10 requires less energy consumption as compared to other freeze crystallization techniques with higher residency time.

In accordance with embodiments of the present disclosure, the size of the saline water droplet is controlled and predetermined to ensure that proper freezing occurs during the calculated residence time (RT) in the chamber. By way of example, if a freezing chamber 35 has a residence time of about 10 microseconds (ms), the droplet size injected into the chamber should be selected to provide for direct contact between all of the saline water droplets and the refrigerant stream, thus ensuring that the cooling of the saline water droplets by direct contact with the expanding refrigerant will produce an efficient heat transfer between the refrigerant and the saline water. By ensuring efficient heat transfer between the saline water droplets and expanding refrigerant, the process power requirements are beneficially and unexpectedly reduced.

As the saline water droplets are super-cooled, or frozen, in chamber 35 to form ice particles or crystals containing no-salt (or essentially no salt) water, salt crystals simultaneously are generated within the chamber. Referring to FIG. 1, the first output 35b of freezing chamber 35 is connected to salt collector 92 for collecting salt crystals, the second output 35a of freezing chamber 35 is connected to ice collector 91 for collecting ice particles, and the third output 35c is fluidly coupled to compressor 20 to create a closed circuit for the refrigerant stream. More specifically, to complete the refrigeration cycle, the refrigerant vapor from expansion device 30 is again a saturated vapor stream 102 and is routed back into the compressor 20. Physical separation of ice and salt can be done by methods known in the art, for example, such as flotation and mechanical separation means As shown in FIG. 1, storage tank or vessel 50 is fluidly coupled to ice melter 80. Storage tank can be any container, vessel, pipe or other storage medium for holding fluids, and it can include any size and various types of tanks, based on the needs of the system. In accordance with the present disclosure, storage tank 50 is operably configured to receive and store pure water produced by ice melter 80. The salt crystals retrieved from freeze chamber 35 are disposed of by conventional means.

Figure 2:
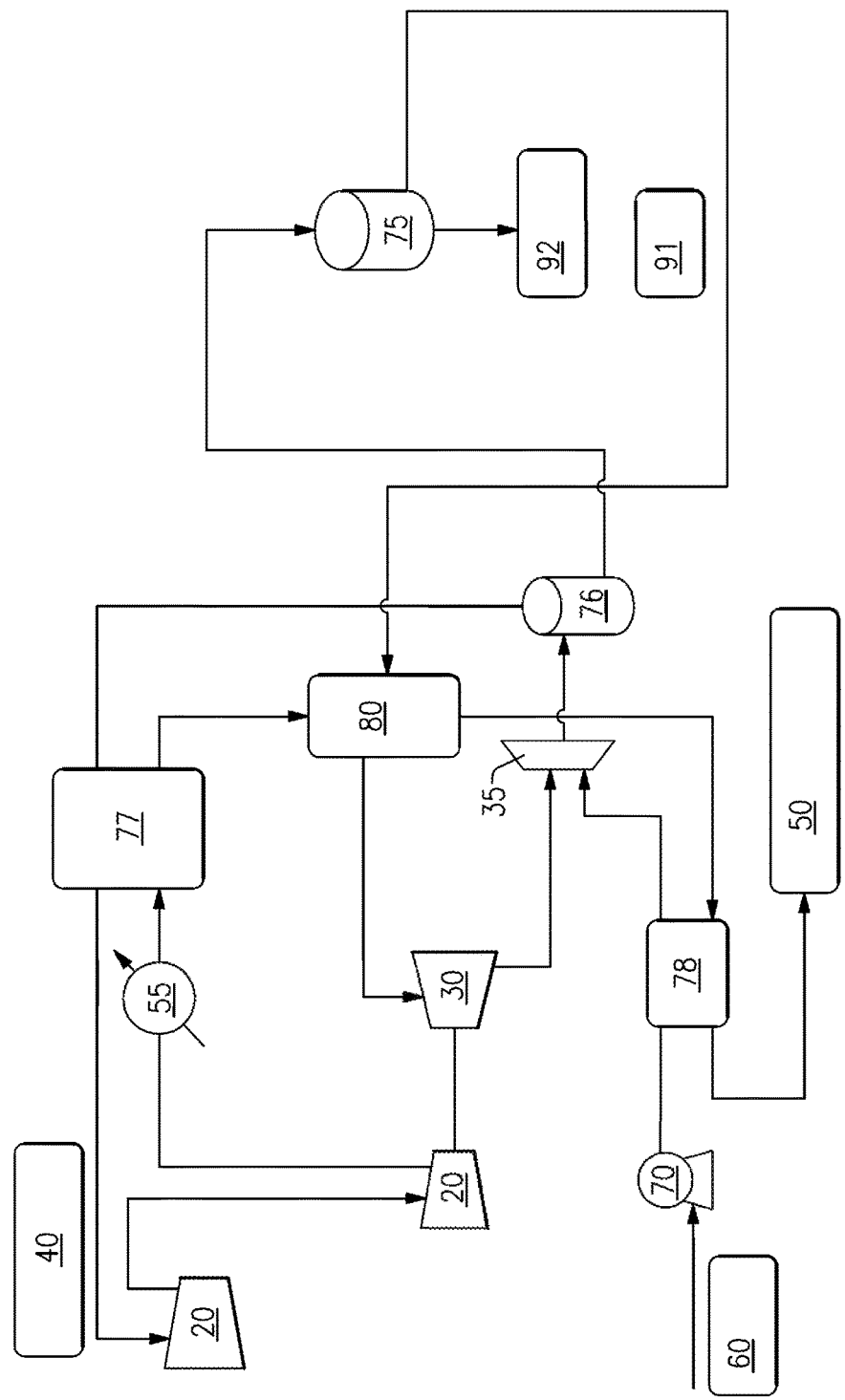
FIG. 2 is illustrates an embodiment of the desalinating system in accordance with aspects of the present disclosure.

In embodiments of the present disclosure, and as shown in more detail in FIG. 2, system 10 also includes an air cooler 55 to cool the pressurized compressed refrigerant 102 from compressor 20; a first heat exchanger 77 to further cool compressed refrigerant 102 so that the refrigerant stream 102 entering ice melter 80 is cold (e.g. about 0° C. or slightly higher) and refrigerant stream 103 leaving the ice melter and entering expansion device 30 is also cold (e.g. about 0° C. or slightly higher); a second heat exchanger 78 to cool saline water 60 (e.g. to about 10° C.); a solid/vapor separator 76; a salt/vice separator 75; and a controller (not shown), external or internal, operable to control the desalination system, control the flow of water and refrigerant through the system, as well as to provide the proper functionality and parameters and/or setting for the system.

In an exemplary embodiment, system 10 is configured for use in a continuous manner for purifying saline water 60. The salinity of the water stream 204 exiting desalination system 10 through outlet 80b will be less than the salinity of the source water 60 entering the desalination system. In accordance with the embodiments of the present disclosure, the difference in salinity will range from about 80 to about 99%. While the system described above may be sufficient in most applications, the system may optionally include an evaporator (not shown) and/or a crystallizer (not shown), or employ other methods and/or systems known in the art, to provide 100% water recovery.

Figure 3:
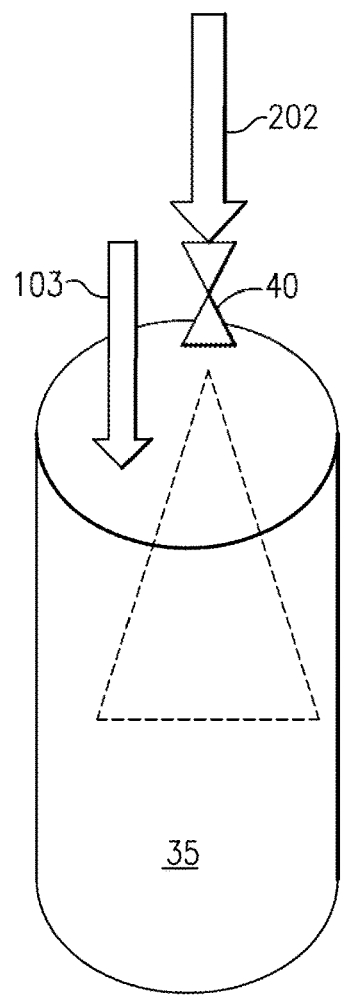
FIG. 3 is a simplified schematic view depicting a turbo expander having crossflow saline water injection in accordance with aspects of the present disclosure.
Figure 4:
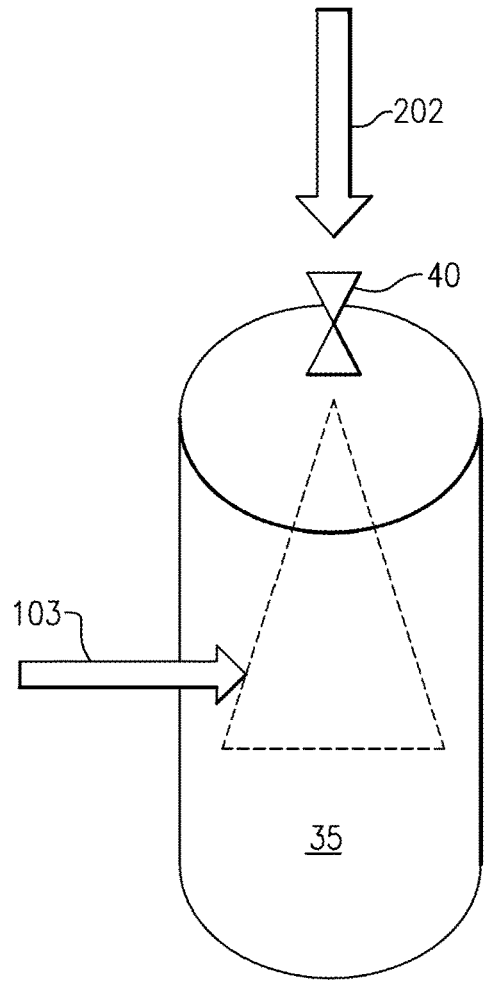
FIG. 4 is a simplified schematic view depicting an alternate embodiment of a turbo expander having parallel saline water injection in accordance with aspects of the present disclosure.

Referring to FIG. 3, in operation and in certain embodiments, the flow of the saline water droplets 202 through freezing chamber 35 is in parallel flow relationship with and in the same direction as the refrigerant stream 103 through freezing chamber 35. In alternate embodiments, flow of the saline water droplets through freezing chamber 35 is in cross flow relationship to the refrigerant stream through freezing chamber 35. For purposes of this disclosure, cross flow relationship means that the saline water flow direction is at 90 degree angle to the flow of the refrigerant stream. In operation, a cross flow system is achieved by introducing the saline water droplets perpendicular to the refrigerant stream. Referring to FIG. 4, in one such embodiment the saline water droplet stream 202 is injected downward through freezing chamber 35 and refrigerant stream 103 is introduced horizontally into chamber 35. In yet another embodiment (not shown), flow of the saline water droplets through freezing chamber 35 is in counter-flow (i.e. opposite) relationship to the refrigerant stream through freezing chamber 35 (for example, saline water droplet stream 202 is injected downward through freezing chamber 35 and refrigerant stream 103 is introduced upward into chamber 35).

FIG. 5 is a simplified schematic illustrating a system wherein the turbo expander 30 and freezing chamber 35 are combined into a single device, shown here as turbo expander 36, such that the refrigerant stream 103 and saline water droplet stream 202 are both simultaneously injected into turbo expander 36. In this embodiment, turbo expander 36 (e.g., a steam turbine or other expansion device) is adapted to handle solid, vapor and liquid phase flow. Referring to FIG. 5, while not required, in this embodiment a solid surface 66 is configured at the exit of turbo expander 36 (i.e. the combined expander/freezing chamber). As ice and salt particles move with a high velocity at the exit of turbo expander 36, the impact of particles with the solid surface 66 results in the particles breaking apart, thus making easier subsequent separation of ice and salt crystals by mechanical, floating, or other known in the art means.

Figure 6:
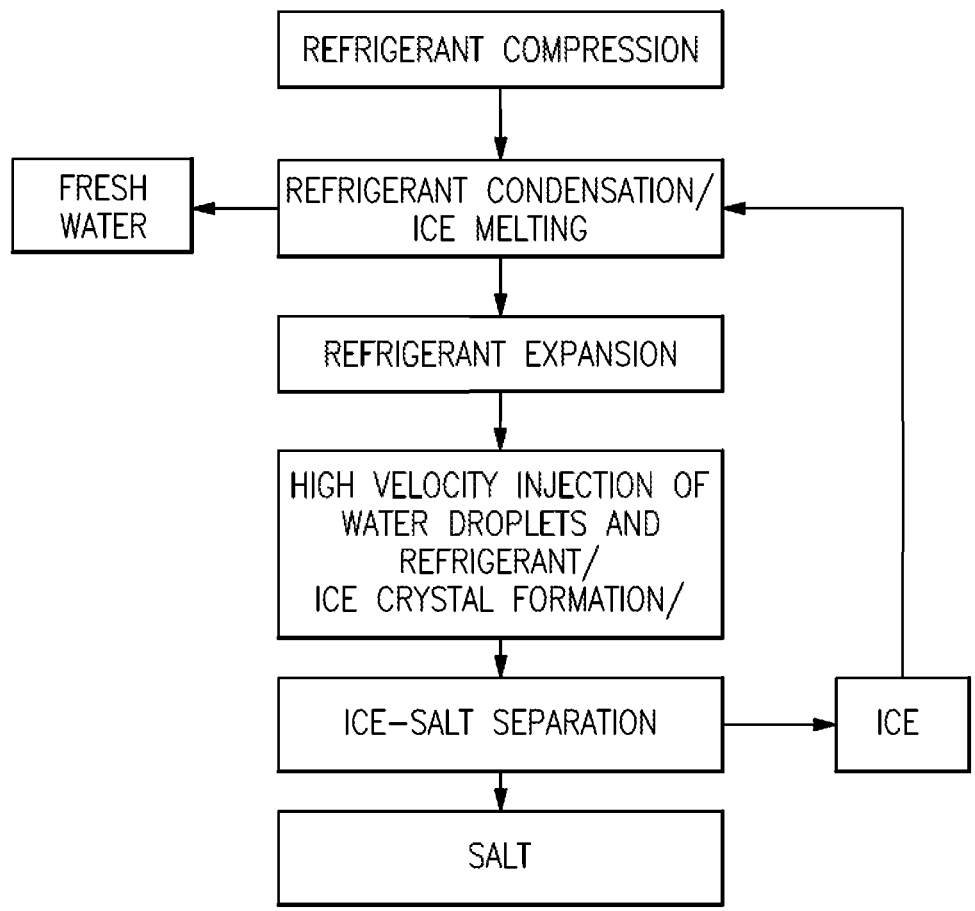
FIG. 6 is a flow chart illustrating the process steps with separate and distinct expansion and high velocity injection steps, in accordance with aspects of the present disclosure.
Figure 7:
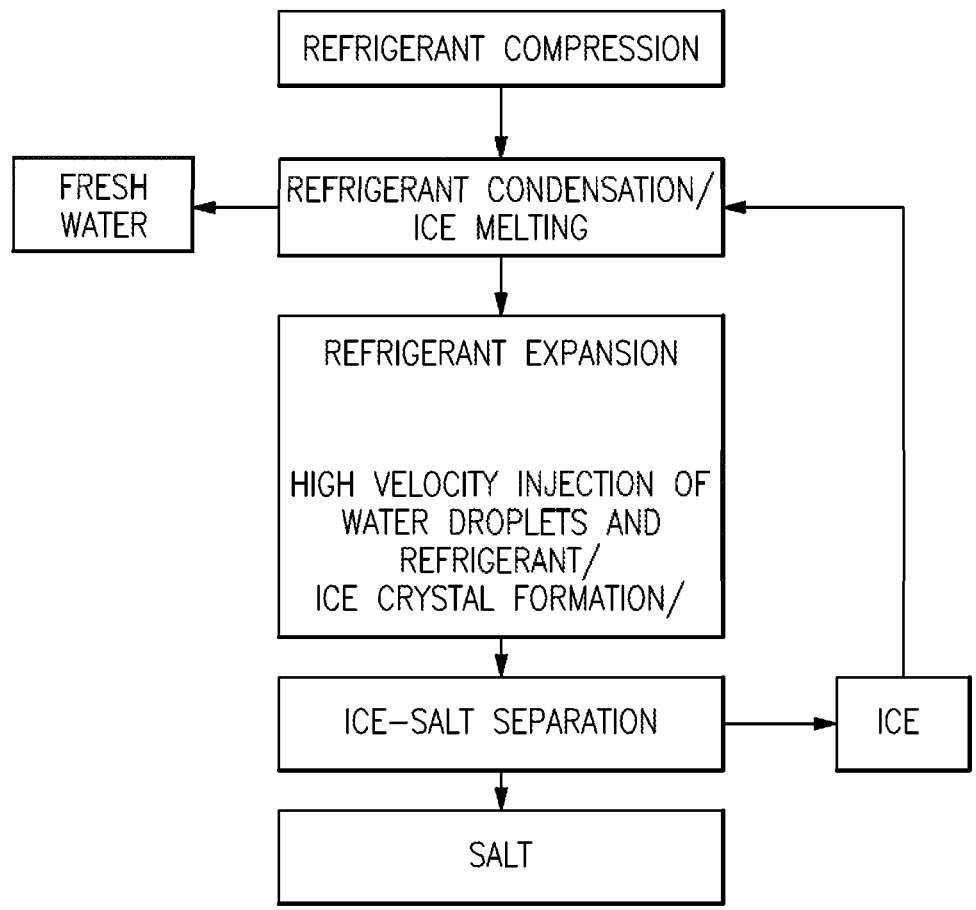
FIG. 7 is a flow chart illustrating the process steps with combined expansion and high velocity injection steps, in accordance with aspects of the present disclosure.

Referring to FIG. 6, there is shown a desalinating process in accordance with a first preferred embodiment of the present disclosure. Referring to FIG. 7, there is shown a desalinating process in accordance with a second preferred embodiment of the present disclosure. The initial steps of the second preferred embodiment are the same as that of the first preferred embodiment. The differences between the first and the second preferred embodiments is that in FIG. 7, the expansion and hyper-cooling steps occur simultaneously and are operatively combined in one device.

In alternate embodiments, the method and system incorporate one or more of the following: an ice separator or a device to mechanically remove ice particles from the freezing chamber. Further, while not illustrated, other mechanisms, such as pumps (to draw water through the system or to/from other components in the system) may be used in accordance with the skills and methods known in the art. Although the desalination system components may be cylindrical in shape, as illustrated in FIG. 1, however other shapes and sizes may be employed for the components. Furthermore, the components for the desalination system may be made of suitable materials. Suitable materials may include one or more material selected from metal or plastic.

EXAMPLES

The following serve as examples, but are not intended to limit the applicability to other turbo-cooling desalination systems. These numbers and amounts are estimated, and are provided for exemplary purposes only. Actual numbers and amounts may vary.

Example 1

Referring to FIG. 5, propane was first compressed to 4.8 bar (480000 pa). At this pressure, propane becomes a liquid at approximately 0.5° C. As a result, part of the propane is liquefied in the ice melter where propane condensation provides heat for melting ice produced at the back-end of the process. Partially liquefied propane is then expanded in a turbo-expander to a pressure of 1.1 bar (110000 Pa) in a two-stage expander. Compressed brine is sprayed in the turbo-expander between two expansion stages. Stream exiting the turbo-expander consist of propane vapor, ice and salt crystals. To facilitate physical separation of ice and salt crystals, high velocity stream exiting the turbo-expander comes in contact with a solid surface such that impact of this contact will break large solid particles into smaller particles.

Brine injection into the turbo-expander has to be done with high slip velocity which results in instability of brine droplets and their breakup. At sufficiently high velocity slip brine droplets will be reduced in size to 10-50 microns and freeze in less than 100 milliseconds. Aspen Plus modeling shows that, for a 1 liter/second (16 gallons/minute) brine flow, process energy requirements are 32 Watt-hours/liter (120 KWh/1,000 gal) of brine for 100% water recovery when propane is used as a refrigerant. When compared to other historical energy requirements, this data reveals an unexpected reduction in energy consumption and costs, and an increase in efficiency.

Example 2

Figure 8:
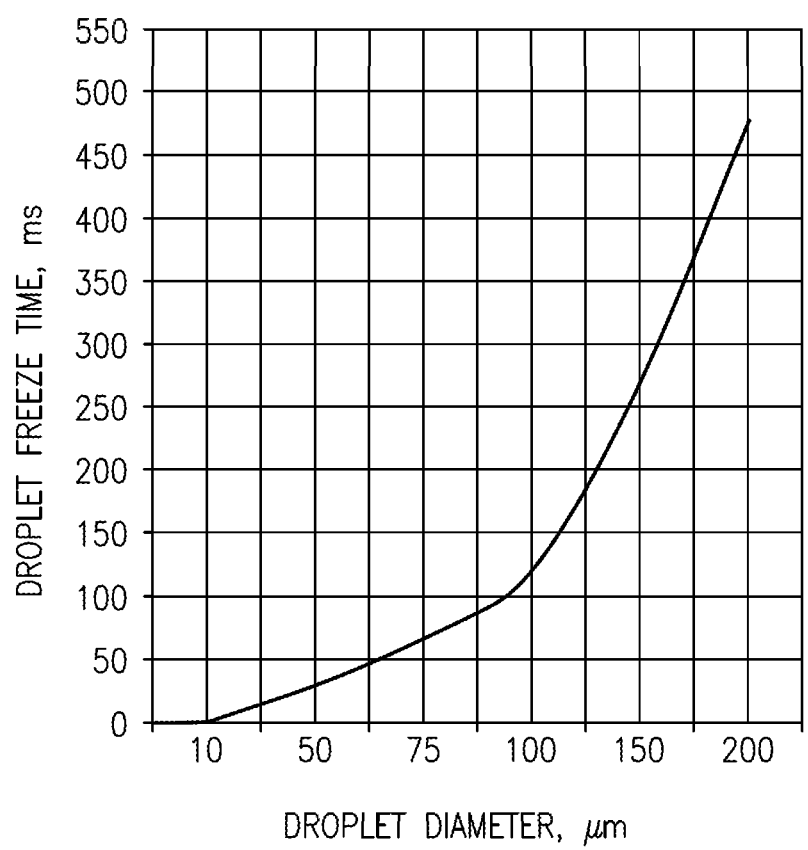
FIG. 8 is a graph of water droplet freezing time as a function of residence time (RT).

In accordance with the present disclosure disclosed herein, the optimal droplet size in the freezing chamber ($d_r$)

is estimated to be in the range of about 10 microns (μ) to about 50 microns (μ), and preferably about 10 μm. To achieve this optimal droplet size, heat transfer analysis indicates that water droplets with initial diameters ($d_i$) up to 200μ will break up to a reduced diameter ($d_r$) of about 10μ when injected with a 90% velocity slip (i.e. 10% of surrounding gas velocity). At shown in FIG. 8, at this velocity, the water droplets with a 10 μm diameter ($d_r$) will freeze in less than 10 ms. The analysis in FIG. 8 was conducted using ANSYS CFX. The water droplets were injected at 0° C. and slip velocity of 90%.

Example 3

Figure 9B:
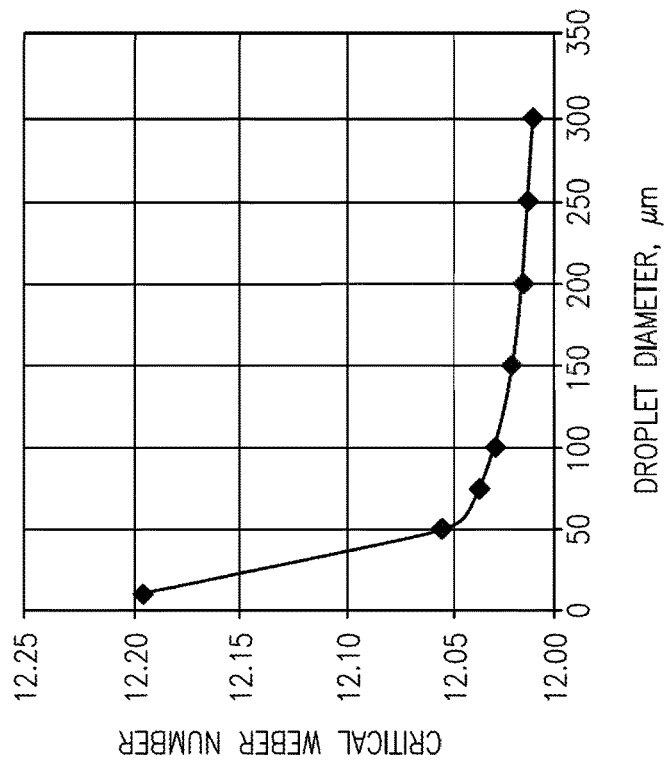
FIGS. 9A and 9B is a graph of water droplet Weber number as a function of droplet diameter ($\mu$).
Figure 9A:
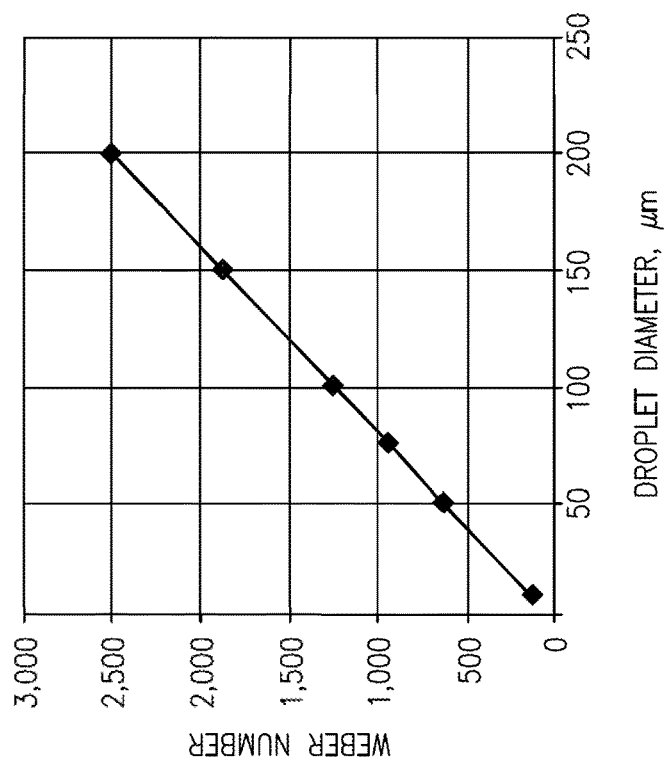

Referring to FIG. 9, the stability of water droplets can be characterized by the We number, wherein $$We = \frac{\text{Droplet Kinetic Energy}}{\text{Droplet Surface Energy}}$$

As shown in FIG. 9, droplets with initial diameters ($d_i$) up to 200 μm has shown that droplets with We number larger than 12 are unstable when injected with 90% velocity slip and breakup until droplet size is reduced to about 10 μm.

Example 4

Figure 10:
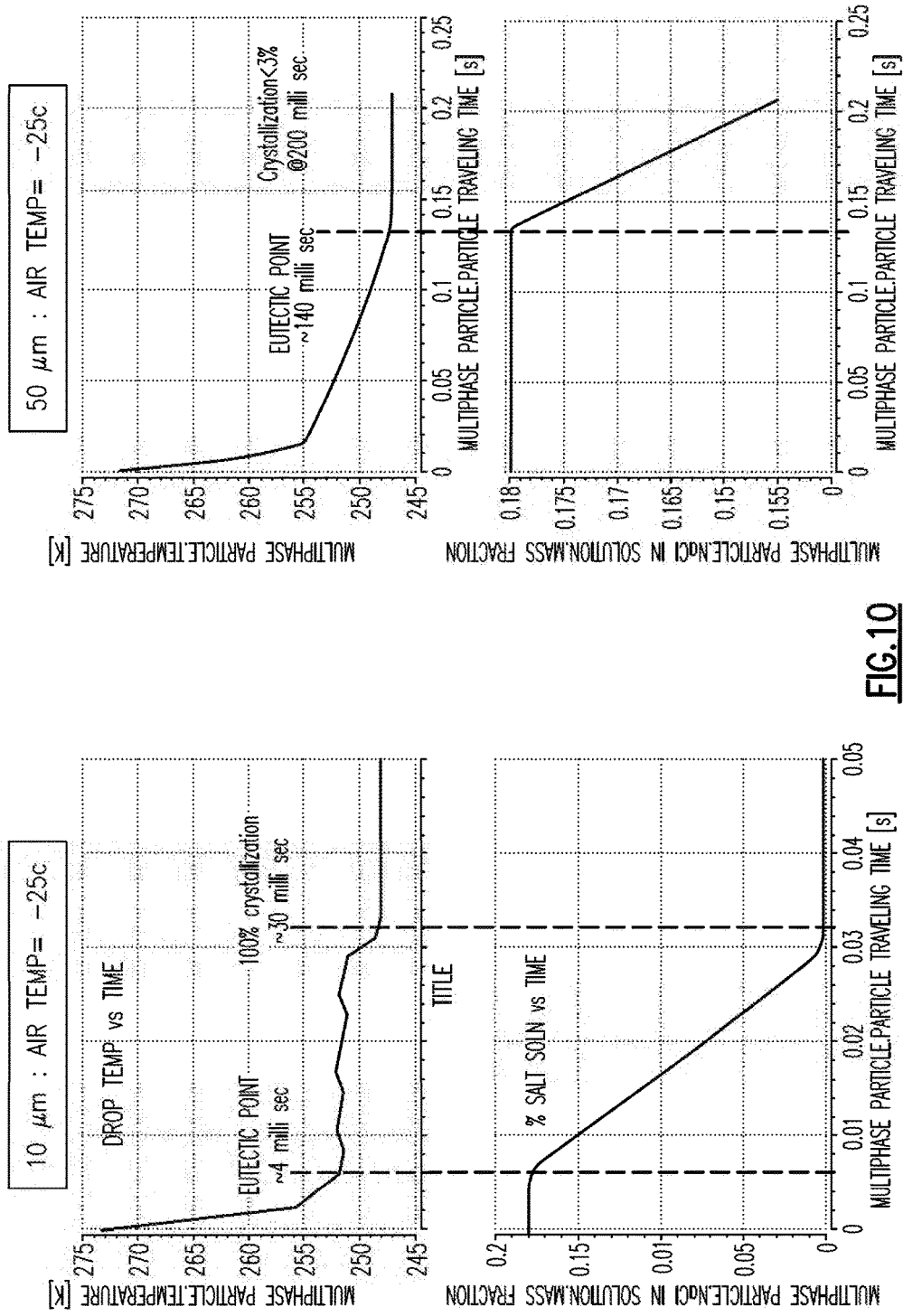
FIG. 10 is a graph illustrating water droplet freeze profile as a function of diameter (d=10 and 50 μm), at a droplet initial temperature of 0° C. and a refrigerant stream temperature of −25° C.

Experiments were conducted with water droplets having an initial temperature of 0° C. and a refrigerant stream with a temperature of −25° C. As shown in FIG. 10, with these parameters, droplets of brine with a diameter of 10 micrometers (μm) achieved 100% crystallization in about 30 milliseconds (ms). In contrast, at the same temperature, droplets of brine with a diameter of 50 μm will only result in less than 3% crystallization at 200 ms.

From the above results, it will be appreciated that the use of a turbo freeze or turbo-cooling process for desalination demonstrates an effectiveness which is both unexpected and unanticipated based on the performance of other common desalination methods, including other freeze crystallization methods. In addition, because the freeze crystallization process is operated at low temperatures, it greatly mitigates and/or avoids the scaling and membrane fouling issues that occur in other thermal and membrane processes, thereby allowing a wider selection of materials and a reduction in chemical usage to combat scaling/fouling. The process and system disclosed herein has a small footprint and low capital cost, therefore making it appropriate for a wide variety of applications, including both large scale operations and small scale operations (e.g. mobile units).

Energy requirements for the process disclosed herein are estimated to be about 45% less than that for other thermal crystallizer applications. For example, in one embodiment, 100% water recovery from 18% salinity brine using propane as a refrigerant required energy in the amount of 32 Watt-hours/liter (120 kWh/1000 gal) of brine. The process also is particularly well-suited for treatment of high salinity water and brine and embodiments of the present disclosure disclosed herein unexpectedly and effectively can treat high salinity water with reduced energy consumption (and cost).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

The invention claimed is:

1. A system for desalination comprising:
   a feed source of saline water;
   a feed source of at least one refrigerant;
   a compressor, comprising an input fluidly coupled to the source of said at least one refrigerant and an output, and configured to generate a compressed vaporized refrigerant;
   a condenser comprising an input fluidly coupled to the compressor and an output, said condenser operatively configured to generate a chilled, partially liquefied refrigerant stream;
   at least one expansion device comprising at least one input fluidly coupled to the condenser and at least one output configured to release the chilled refrigerant stream at a refrigerant stream injection velocity;

a freezing chamber comprising at least one input to introduce the chilled refrigerant stream into the chamber, and a first, second and third output, and at least one injector configured to introduce the saline water into the freezing chamber in the form of saline water droplets, wherein the at least one ejector introduces the saline water droplets into the freezing chamber at a slip injection velocity relative to the refrigerant stream injection velocity of about 10% to about 180%;

and wherein direct contact in the chamber between the saline water droplets and the refrigerant stream forms ice particles comprising pure water, wherein the at least one expansion device is a two-stage turbo expander and the turbo expander is adapted to function as the freezing chamber.

2. The system of claim 1, wherein the freezing chamber is a separate crystallization tank.

3. The system of claim 1, wherein the at least one injector is a sprayer comprising a nozzle operatively configured to introduce saline water droplets with an initial diameter ($d_i$) in the range of about 200 microns ($\mu$) to about 1000 microns ($\mu$) into the freezing chamber.

4. The system of claim 1, wherein the at least one ejector introduces the saline water droplets into the freezing chamber at a slip injection velocity relative to the refrigerant stream velocity that is sufficient to achieve saline water droplets with a reduced diameter ($d_r$) in the range of about 10 microns ($\mu$) to about 50 microns ($\mu$).

5. The system of claim 1, wherein the at least one injector introduces saline water droplets into the freezing chamber at a slip injection velocity in the range of about 48% to about 120%.

6. The system of claim 5, wherein the at least one injector introduces saline water droplets into the freezing chamber at a slip injection velocity of about 90%.

7. The system of claim 1, wherein flow of the saline water droplets through the freezing chamber is in parallel flow relationship with and in the same direction as the refrigerant stream through the freezing chamber.

8. The system of claim 1, wherein flow of the saline water droplets through the freezing chamber is in cross-flow relationship to the refrigerant stream through the freezing chamber.

9. The system of claim 1, wherein the at least one refrigerant is selected from the group consisting of a hydrocarbon, ammonia, chlorine-containing carbon compounds, and fluorine-containing carbon compounds.

10. The system of claim 9, wherein the hydrocarbon comprises propane, isopentane, butane, iso-butane, pentane, or mixtures thereof.

11. The system of claim 1, wherein the temperature of the refrigerant stream in the freezing chamber is in the range of about 0° C. to about −50° C.

12. The system of claim 1, wherein the first output of the freezing chamber is connected to a salt collector for collecting salt crystals, the second output of the freezing chamber is connected to an ice collector for collecting ice particles, and the third output is fluidly coupled to the compressor to create a closed circuit for the refrigerant stream.

13. The system of claim 12, wherein the condenser is an ice melter fluidly connected to the ice collector and operatively configured to melt the ice particles to produce water containing no or essentially no salt and to condense the refrigerant stream by indirect heat exchange.

14. The system of claim 1, further characterized by one of the following: (a) said compressor, condenser, and turbo expander operatively are connected in a closed series relation to create a closed system and the at least one refrigerant circulates in the closed circuit; or (b) said compressor, condenser, turbo expander, and freezing chamber operatively are connected in a closed series relation to create a closed system and the at least one refrigerant circulates in the closed system.

15. The system of claim 1, further comprising at least one of the following:
an ice separator;
a solid/vapor separator;
a salt/vapor separator;
a device to mechanically remove ice particles from the freezing chamber;
a pump configured to compress the saline water stream prior to introduction into the at least one nozzle;
a storage tank fluidly connected to the ice melter that stores pored water derived from the ice particles;
an air cooler to cool the compressed refrigerant stream;
at least one heat exchanger configured to cool the compressed refrigerant stream after it exits the air cooler;
a second heat exchanger configured to cool the saline water stream before injection into the chamber; and
a controller operable to control the desalination system.

16. A desalinating process, comprising:
(a) providing at least one refrigerant and a feed source of saline water;
(b) compressing the at least one refrigerant to generate a partially liquefied, chilled refrigerant stream;
(c) expanding the refrigerant stream through an expansion device;
(d) injecting the saline water into a freezing chamber in the form of water droplets, wherein said saline water droplets have an initial diameter ($d_i$) of less than about 1 millimeter (mm);
(e) contacting the saline water droplets with the expanded refrigerant stream in the freezing chamber at a slip injection velocity relative to the refrigerant stream injection velocity of about 10% to about 180% and for a residence time of about 100 to 300 milliseconds (ms), thereby freezing the water droplets to form ice particles comprising no or essentially no salt;
(f) removing and storing the salt crystals and the ice particles in two different collectors;
(g) delivering the ice particles to an ice melter; and
(h) withdrawing pure water from the ice inciter, wherein the expansion device in (c) and the freezing chamber in (d) comprise one and the same vessel and the vessel is a multi-stage turbo expander and (c)-(e) are carried out substantially simultaneously in said turbo expander.

17. The process of claim 16, wherein the water droplets are introduced into the freezing chamber at a slip velocity relative to the refrigerant stream that is sufficient to generate saline water droplets with a reduced diameter ($d_r$) in the range of about 10 microns ($\mu$) to about 50 microns ($\mu$) and further characterized by one of the following: (a) wherein flow of the saline water droplet stream through the chamber is cross-current to flow therethrough of the refrigerant stream; or (b) wherein flow of the saline water droplet stream in the chamber is parallel to and in substantially the same direction as the flow therethrough of the refrigerant stream.

18. The process of claim 16, wherein said refrigerant is selected from the group consisting of a hydrocarbon, ammonia, chlorine-containing carbon compounds, and fluorine-containing carbon compounds, and the ice melter is a condenser that melts the ice particles by indirect heat exchange between the refrigerant stream and the ice particles to produce pure water and the partially liquefied, chilled refrigerant stream of (b).

19. The process of claim 16, wherein said refrigerant is air.

\* \* \* \* \*